(12) United States Patent  
Leibfried et al.

(10) Patent No.: US 9,127,706 B2
(45) Date of Patent: Sep. 8, 2015

(54) ONE WAY SLIP MOUNTING APPARATUS

(71) Applicants: Michael R. Leibfried, Lancaster, WI (US); Kurt W. Leibfried, Lancaster, WI (US)

(72) Inventors: Michael R. Leibfried, Lancaster, WI (US); Kurt W. Leibfried, Lancaster, WI (US)

( * ) Notice: Subject to any disclaimer, the term of this patent is extended or adjusted under 35 U.S.C. 154(b) by 242 days.

(21) Appl. No.: 13/771,962

(22) Filed: Feb. 20, 2013

(65) Prior Publication Data

US 2013/0216328 A1 Aug. 22, 2013

Related U.S. Application Data

(60) Provisional application No. 61/601,423, filed on Feb. 21, 2012.

(51) Int. Cl.

| | |
|---|---|
| *F16B 39/32* | (2006.01) |
| *A47K 13/10* | (2006.01) |
| *F16B 31/02* | (2006.01) |
| *A47K 13/26* | (2006.01) |
| *F16B 37/12* | (2006.01) |
| *E03D 11/16* | (2006.01) |

(52) U.S. Cl.
CPC ............... *F16B 39/32* (2013.01); *A47K 13/10* (2013.01); *A47K 13/26* (2013.01); *F16B 31/02* (2013.01); *E03D 11/16* (2013.01); *F16B 37/122* (2013.01)

(58) Field of Classification Search
CPC ........ F16B 39/32; F16B 31/02; F16B 37/122; F16B 37/02; A47K 13/26; E03D 11/16
USPC .......... 411/326, 8, 9, 14, 184–189, 80.1, 396, 411/193, 329, 435, 952
See application file for complete search history.

(56) References Cited

U.S. PATENT DOCUMENTS

| | | | | |
|---|---|---|---|---|
| 269,412 | A * | 12/1882 | Heaton | 411/149 |
| 1,956,745 | A * | 5/1934 | Payne | 411/186 |
| 3,691,897 | A * | 9/1972 | Mullaney | 411/8 |
| 4,741,654 | A * | 5/1988 | Lovisek | 411/186 |
| 5,378,097 | A * | 1/1995 | Barnavol | 411/38 |
| 5,725,285 | A * | 3/1998 | Niebling et al. | 301/105.1 |
| 5,913,647 | A * | 6/1999 | Hodge | 411/11 |
| 6,736,579 | B2 * | 5/2004 | Lonnqvist et al. | 411/396 |
| 7,097,402 | B2 * | 8/2006 | Winker | 411/114 |

* cited by examiner

*Primary Examiner* — Gary Estremsky
(74) *Attorney, Agent, or Firm* — Foley & Lardner LLP

(57) ABSTRACT

A mounting apparatus includes a bolt and a nut. The nut includes an inner member having a first engagement feature and a threaded opening, the threaded opening configured to receive the bolt, and an outer member having a second engagement feature. The inner member is axially coupled to the outer member via a snap fit. The inner member is configured to rotationally lock with the outer member through the interaction of the first engagement feature and the second engagement feature via an application of a threshold torque.

19 Claims, 15 Drawing Sheets

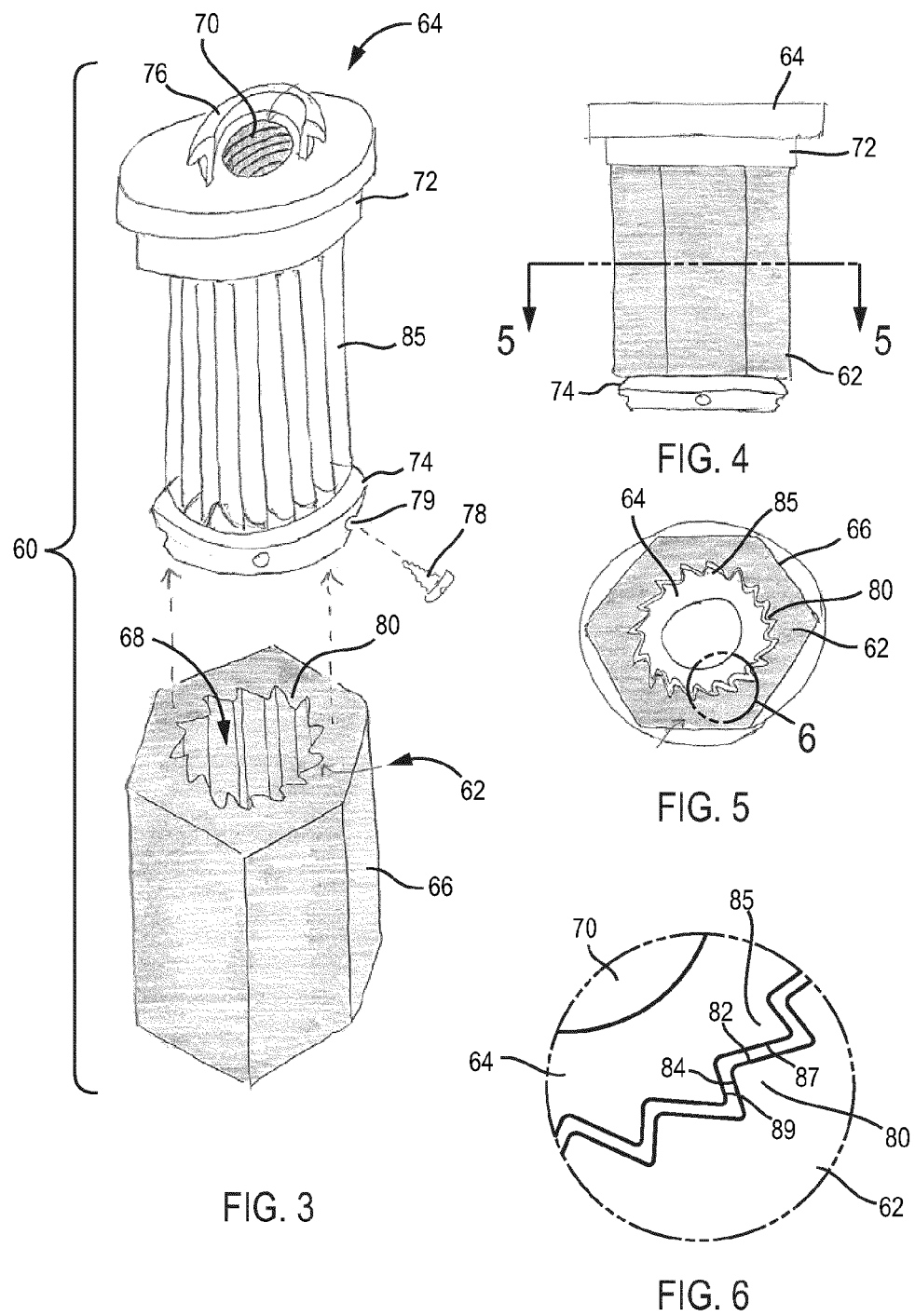

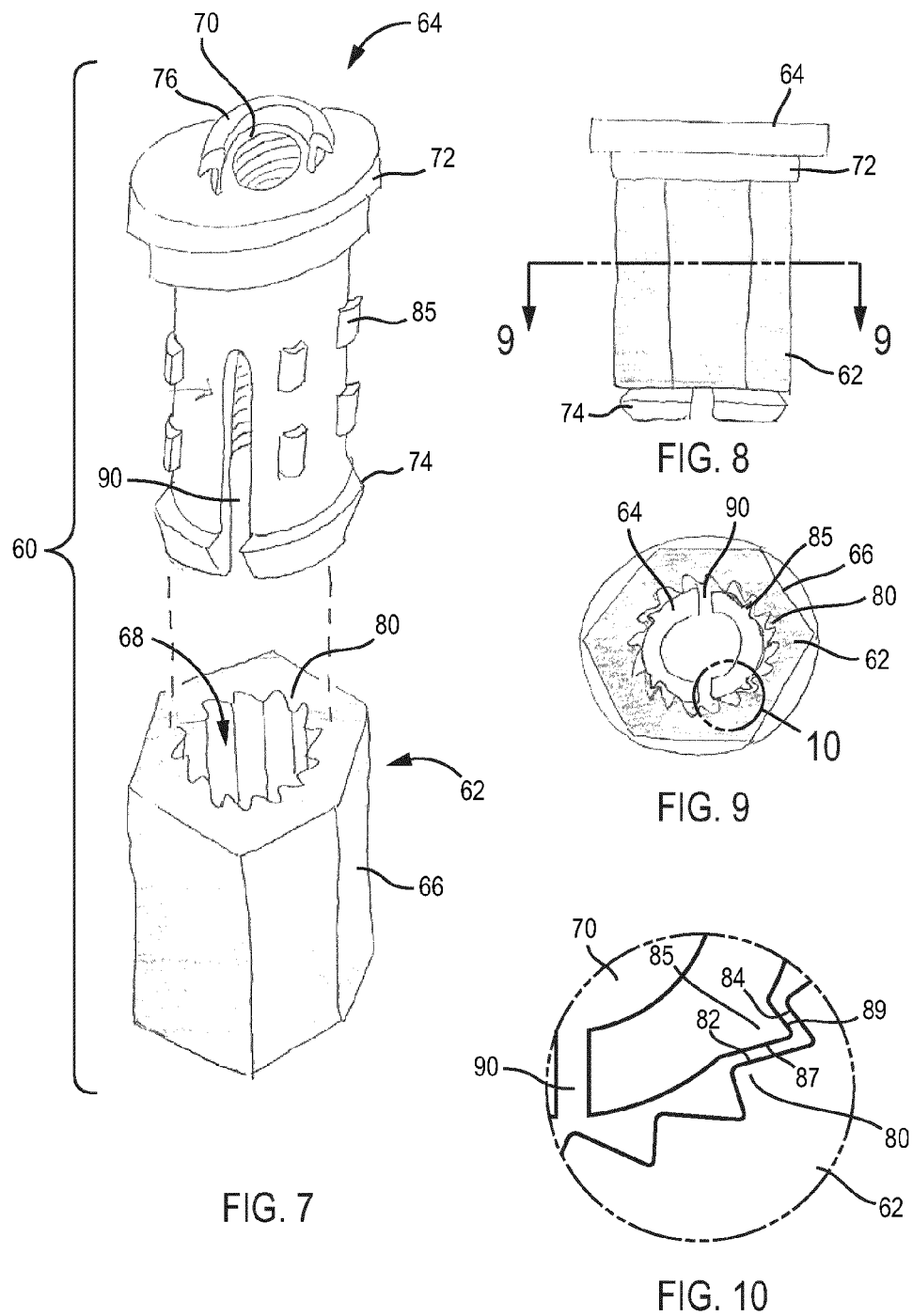

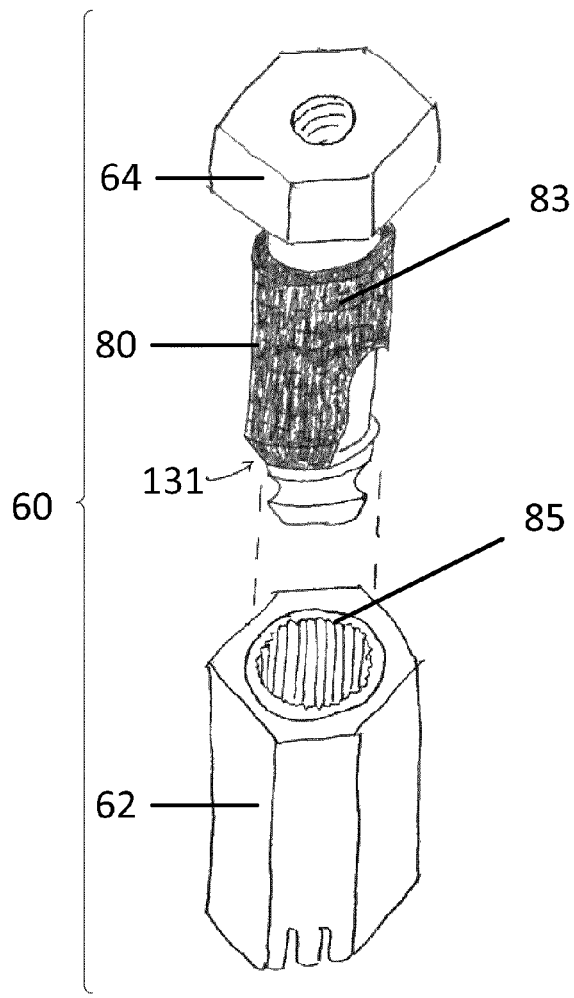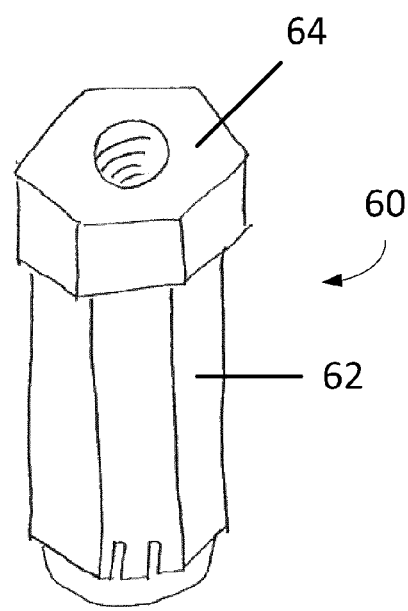
FIG. 23
FIG. 24

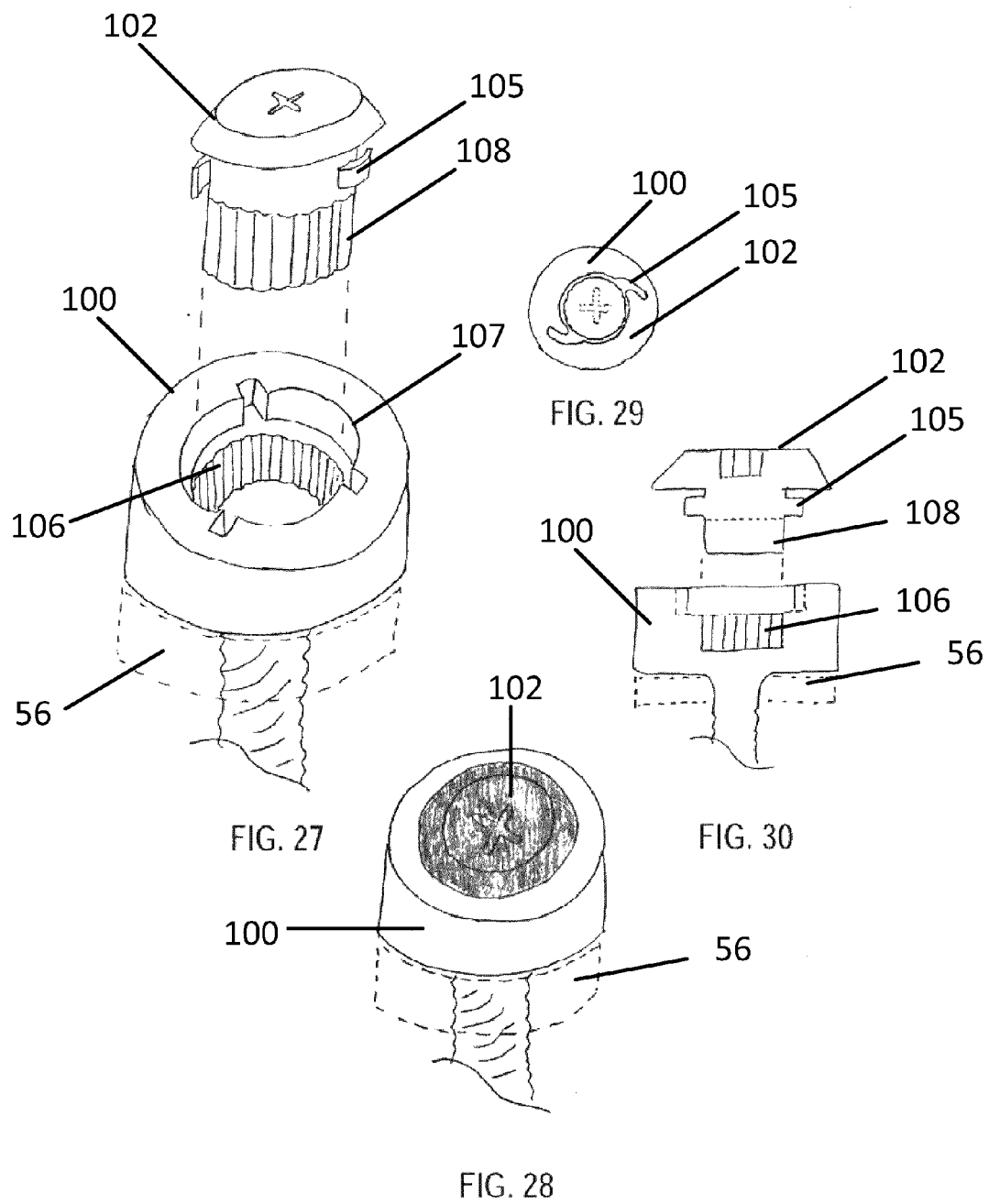

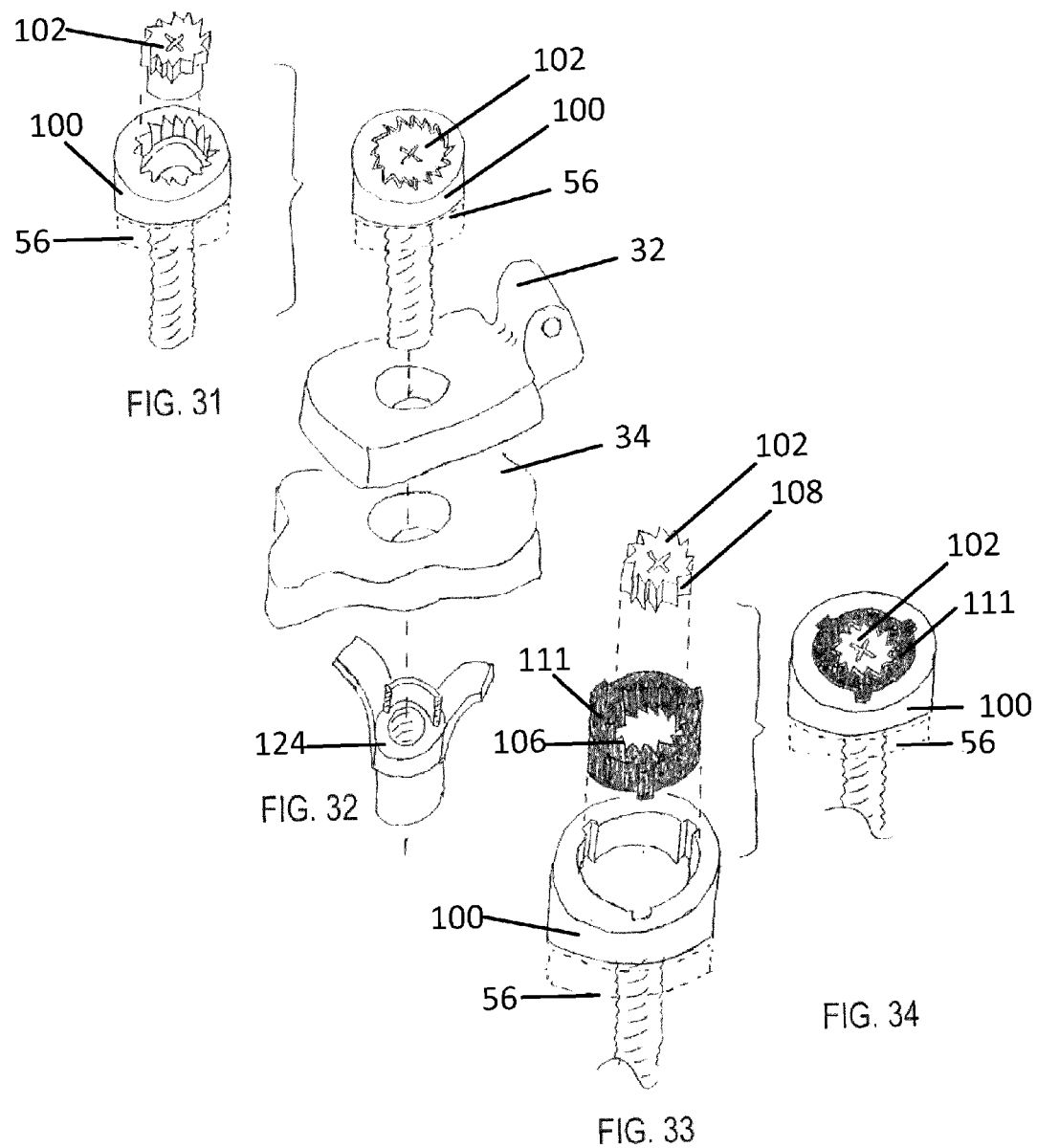

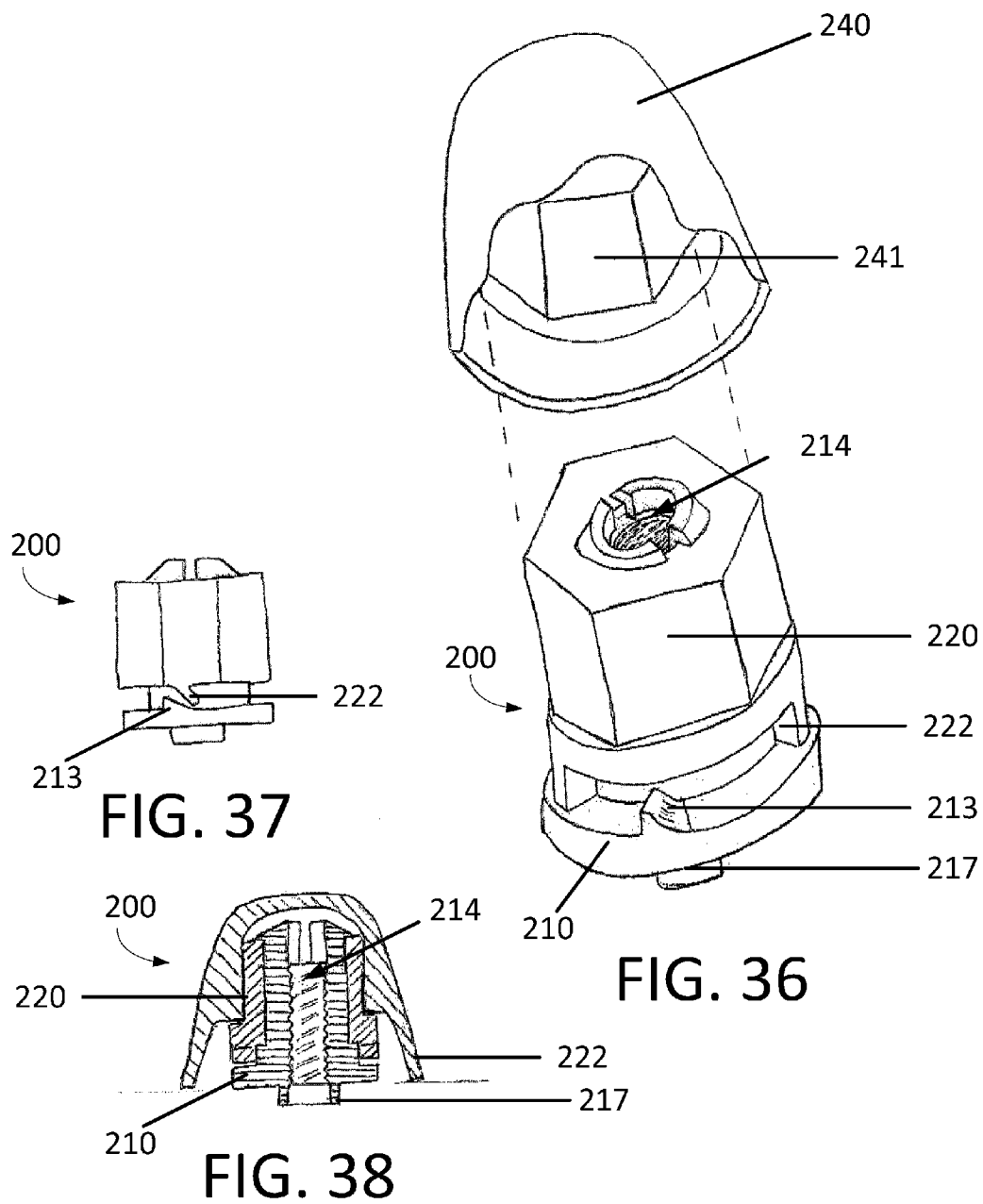

ONE WAY SLIP MOUNTING APPARATUS

CROSS-REFERENCE TO RELATED APPLICATIONS

This application claims priority to U.S. Provisional Application No. 61/601,423, filed on Feb. 21, 2012, which is hereby incorporated by reference in its entirety.

FIELD

The present technology relates generally to the field of mounting and fastening apparatuses. In particular, the present technology relates to a mounting apparatus that facilitates tightening of the mounting apparatus to a predetermined torque.

BACKGROUND

A typical toilet involves fastening points associated with attaching a toilet bowl to a floor (or toilet floor flange), a toilet bowl to a toilet tank, and a toilet seat to a toilet bowl. The fastening elements for attaching these components typically involve a bolt and a nut.

The bolt extends through an opening (mounting hole) in the toilet bowl and/or tank, and engages a nut on the opposite side. The mounting holes in a toilet bowl and/or tank, are typically larger than the diameter of the related bolt, which can increase the negative affect of an inadequate clamping force between the nut and the bolt. Over time, as the nut loosens, the fastened components (bowl, tank, and seat), can begin to slide and shift due to the space or "play" between the bolt and the associated porcelain mounting hole. It is therefore desirable to tighten the bolt to a sufficient degree, and to provide an optional integral bushing, to prevent the components from shifting, relative to each other. However, an excessive torque applied to the bolt or nut, may create a compressive force that is too strong, which can crack or damage the brittle porcelain toilet bowl and/or tank, or the associate toilet floor flange.

The torque applied to the threaded connection may be controlled with a device such as a torque wrench. However, some torque wrenches may be difficult to use, especially in confined areas around a toilet. Further, a consumer installing these toilet components may not have access to a torque wrench, which is a relatively expensive specialty tool. Additionally, the consumer would need to know what torque setting to apply to a torque wrench if such a tool was used.

Therefore, it would be desirable to provide a mounting apparatus for connecting toilet components, with an integral formed torque control feature to provide preferred and adequate torque, but yet a limited torque, to prevent over-tightening and damage.

Additionally, an integrally molded bushing, made part of the mounting apparatus, will further provide an enhanced fastening system, whereas the bushing will help eliminate the "play" between a bolt and its associated porcelain opening or mounting hole.

Although the innovative mounting apparatus presented herewith is applicable to fastening elements associated with brittle porcelain toilet components, it should be noted that the mounting apparatus as presented, is not limited to toilet applications and could apply anywhere in industry where such a torque controlled fastener, with or without an integral bushing, would be beneficial.

SUMMARY

In one aspect, a mounting apparatus is provided including a bolt and a nut. The nut includes an inner member comprising a first engagement feature and a threaded opening for receiving the bolt; and an outer member with a second engagement feature. The inner member is rotationally locked with the outer member through the interaction of the first engagement feature and the second engagement feature and wherein the first engagement feature releases from the second engagement feature by the application of a threshold torque to allow the outer member to rotate relative to the inner member.

In another aspect, a mounting apparatus is provided including a nut and a bolt. The bolt includes a threaded end; a first member comprising a first engagement feature; and a second member coupled to the threaded end and comprising a second engagement feature. The first member is rotationally locked with the second member through the interaction of the first engagement feature and the second engagement feature and wherein the first engagement feature releases from the second engagement feature by the application of a threshold torque to allow the lower member to rotate relative to the upper member.

In another aspect, a mounting apparatus is provided including a bolt; and a nut, which includes an inner member having a first engagement feature and a threaded opening, the threaded opening configured to receive the bolt; and an outer member having a second engagement feature; wherein: the inner member is axially coupled to the outer member via a snap fit; and the inner member is configured to rotationally lock with the outer member through the interaction of the first engagement feature and the second engagement feature via an application of a threshold torque. The second engagement feature may include at least one flex tab. The mounting apparatus may also include a catch configured to allow the outer member to rotate in a first direction relative to the inner member. The catch may be configured to prevent the outer member from rotating in a second direction, opposite to the first direction, by interaction of the catch and the at least one flex tab. The nut may be a hex nut, a knurled nut, or a wingnut. The nut further may also include a cap configured to cover the outer member. The first engagement feature may include a wedge-shaped protrusion and the second engagement feature may include at least one rectangular-shaped protrusion. In some embodiments, a base of the inner member includes an integral bushing configured to collapse to fill a gap between a bolt surface and an edge of a mounting hole in which the mounting apparatus is mounted. In some embodiments, a base of the inner member includes an integral bushing configured to not collapse to fill a gap between a bolt surface and an edge of a mounting hole in which the mounting apparatus is mounted. The inner member may also include a third engagement feature configured to provide a secondary engagement feature for securing the inner member and the outer member. In some embodiments, the third engagement feature includes a hex configuration or at least one flat surface. In some embodiments, the inner member further includes a plurality of crush ribs configured to provide a friction fit between the inner member and the outer member.

In another aspect, a one-way slip fastener is provided including a nut having an inner member including a first engagement feature and a threaded opening, the threaded opening configured to receive the bolt; and an outer member including a second engagement feature; wherein: the inner member is axially coupled to the outer member via a snap fit; and the inner member is configured to rotationally lock with the outer member through the interaction of the first engagement feature and the second engagement feature via an application of a threshold torque. The first engagement feature may include a catch, and the second engagement feature may include at least one flex tab, the catch configured to allow the outer member to rotate in a first direction relative to the inner member. The catch may be further configured to prevent the outer member from rotating in a second direction, opposite to the first direction, by interaction of the catch and the at least one flex tab. The nut may be one of a hex nut, a knurled nut, or a wingnut. The nut may also include a cap configured to cover the outer member. In some embodiments, the first engagement feature includes a wedge-shaped protrusion and the second engagement feature includes at least one rectangular-shaped protrusion. In some embodiments, a base of the inner member includes an integral bushing. In some embodiments, the inner member further includes a third engagement feature having a hex configuration or at least one flat surface, the third engagement feature configured to provide a secondary engagement feature for securing the inner member and the outer member. The inner member may further include a plurality of crush ribs configured to provide a friction fit between the inner member and the outer member.

In another aspect, a mounting apparatus is provided for coupling a toilet seat hinge to a toilet flange. The mounting apparatus includes a bolt; and a nut comprising at least one wing; wherein the wing is deformed by the toilet flange when the mounting apparatus is tightened by advancing the nut onto the bolt.

It is to be understood that both the foregoing general description and the following detailed description are illustrative and explanatory only, and are not restrictive of the technology as claimed.

BRIEF DESCRIPTION OF THE DRAWINGS

FIG. 3 is an exploded view of a two part torque control nut for a mounting apparatus, according to an exemplary embodiment.

FIG. 4 is a side view of the nut of FIG. 3

FIG. 5 is cross-section view of the nut of FIG. 4, taken along line 5-5.

FIG. 6 is a detail view of the teeth of the nut of FIG. 5.

FIG. 7 is an exploded view of a two part torque control nut for a mounting apparatus, according to another exemplary embodiment.

FIG. 8 is a side view of the nut of FIG. 7.

FIG. 9 is cross-section view of the nut of FIG. 8, taken along line 9-9.

FIG. 10 is a detail view of the teeth of the nut of FIG. 9.

FIG. 23 is an exploded view of a torque control nut for a mounting apparatus, according to an exemplary embodiment.

FIG. 24 is an isometric view of the torque control nut of FIG. 23.

FIG. 27 is an exploded view of a torque control bolt for a mounting apparatus, according to an exemplary embodiment.

FIG. 28 is an isometric view of the torque control bolt of FIG. 27.

FIG. 29 is a bottom view of the torque control bolt of FIG. 27.

FIG. 30 is a cross-section view of the torque control bolt of FIG. 27.

FIG. 31 is an exploded view of a torque control bolt for a mounting apparatus, according to an exemplary embodiment.

FIG. 32 is an exploded view of a mounting apparatus with the torque control bolt of FIG. 31.

FIG. 33 is an exploded view of a torque control bolt for a mounting apparatus, according to an exemplary embodiment.

FIG. 34 is an isometric view of the torque control bolt of FIG. 33.

FIG. 36 is an isometric view of the one-way fastening nut of FIG. 35.

FIG. 37 is a side view of the one-way fastening nut of FIG. 35 without a decorative cap.

FIG. 38 is a side cross-sectional view of the one-way fastening nut of FIG. 35.

DETAILED DESCRIPTION

In one aspect, a mounting apparatus for components of a toilet seat to a toilet is provided. In one embodiment, the mounting apparatus includes a bolt extending through an opening in one or more components of the toilet to engage a nut. The mounting apparatus may be utilized to couple together two components of the toilet, such as the toilet seat and the toilet bowl flange, or may be utilized to couple a component of the toilet to another body, such as the toilet and the floor. As the bolt and the nut are tightened, the components are compressed. A certain amount of compression is desirable to provide a snug fit that is less likely to loosen over time. However, excessive compressive force may fracture one or both of the components. The mounting apparatus therefore includes an integral relief feature that will release if an excessive torque is applied to the bolt and nut. The toilet mounting apparatus may be used in residential or commercial applications.

Figure 1:
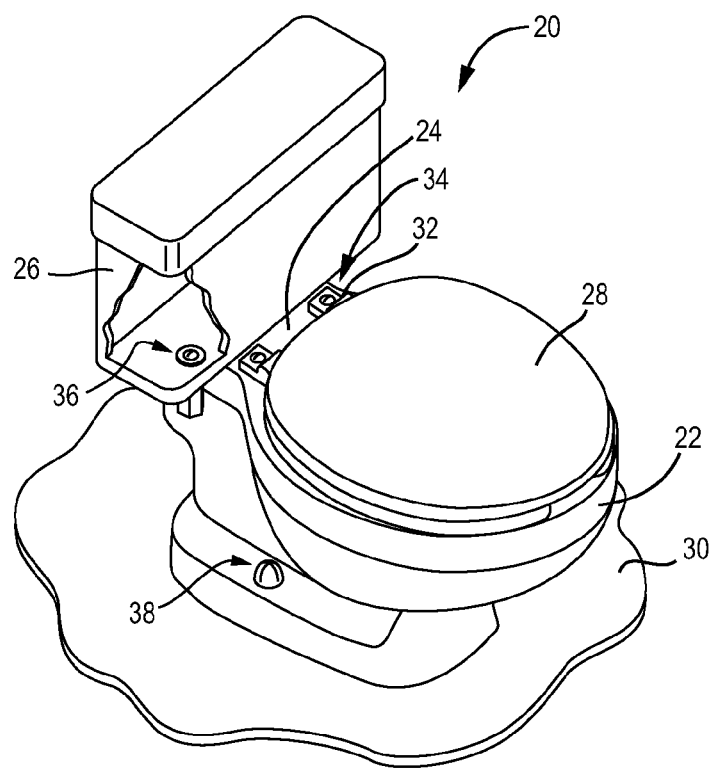
FIG. 1 is an isometric view of a toilet with components coupled together with mounting apparatuses, according to an exemplary embodiment.

Referring to FIG. 1, a toilet 20 is illustrated coupled to a surface such as a floor 30. The toilet 20 includes a bowl 22, a tank or reservoir 26, and a seat 28. A flange 24 extends inwardly around the rim of the bowl 22. The toilet seat 28 is coupled to the flange 24 of the bowl 22 with one or more seat mounting devices, or hinges 32 and mounting apparatuses 34. The tank 26 is coupled to the bowl 22 with one or more mounting apparatuses 36. The bowl 22 is coupled to the floor 30 with one or more mounting apparatuses 38.

Figure 2:
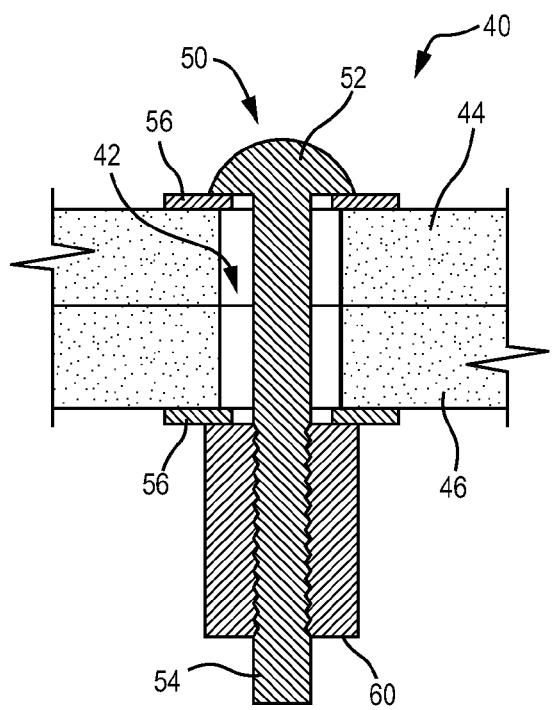
FIG. 2 is a schematic cross-section view of an apparatus for coupling together components of a toilet, according to an exemplary embodiment.

Referring now to FIG. 2, mounting apparatuses 34 and 36 may be a mounting apparatus 40 (e.g., a fastening device, etc.) that is received in aligned openings or apertures 42 in a first component 44 and a second component 46. In one exemplary embodiment, the first component 44 may be a toilet seat hinge 32 and the second component 46 may be a toilet bowl flange 24. In another exemplary embodiment, the first component 44 may be a toilet tank 26 and the second component 46 may be a toilet bowl flange 24. In another exemplary embodiment, the first component 44 may be the base of the toilet bowl 22 and the second component 46 may be the floor 30.

The apparatus 40 is shown schematically in FIG. 2 to include a threaded bolt 50 such as a threaded rod, screw, or a bolt extending through apertures 42 formed in the first component 44 and the second component 46. The bolt 50 includes an upper portion or head 52 and a threaded end 54. According to an exemplary embodiment, the bolt 50 engages a threaded nut 60 provided on the opposite side of the aperture 42. The aperture 42 has a diameter that is larger than the threaded end 54 of the bolt 50, but smaller than the diameter of the upper portion 52. Through the interconnection of the bolts 50 and the nuts 60, the first component 44 may be coupled to the second component 46. One or more additional components such as washers 56 may be provided to facilitate the coupling of the first component 44 and the second component 46.

Referring now to FIGS. 3-6, a nut 60 for a mounting apparatus is shown according an exemplary embodiment. The nut 60 includes a release feature to reduce the likelihood of the first component 44 or the second component 46 being fractured or otherwise damaged by an excessive torque applied to tighten the bolt 50 and the nut 60. The nut 60 includes an outer portion or sleeve 62, and an inner portion or insert 64 that is configured to rotate relative to the sleeve 62 if a sufficient torque is applied to the nut 60. One or more additional components such as a washer 56 may be provided to facilitate coupling of the bolt 50 and the nut 60.

The sleeve 62 includes an outer surface 66. A user engages the outer surface 66 to tighten the nut 60 to the bolt 50. According to an exemplary embodiment shown in FIGS. 3-6, the sleeve 62 may have a hexagonal outer surface 66 for use with a wrench. However, in other exemplary embodiments, the outer surface 66 may be a knurled or otherwise textured surface. In still other embodiments, the sleeve may include other features such as wings or ribs to facilitate the tightening of the nut 60.

A central opening 68 extends along the longitudinal axis of the sleeve and is configured to receive the insert 64. The insert 64 is a generally cylindrical body with a threaded opening 70 that receives the threaded end 54 of the bolt 50. The insert 64 further includes an upper flange 72 and a lower flange 74 that have diameters greater that the diameter of the central opening 68 in the sleeve 62. The insert 64 is inserted into the sleeve 62 with a snap fit and is retained in the central opening 68 by the upper flange 72 and the lower flange 74.

The insert 64 may include an integrally formed bushing 76. The bushing 76 is sized such that it may be placed in the aperture 42. In one embodiment, the outer diameter of the bushing 76 is slightly larger than the diameter of the aperture 42. An interference fit is therefore formed between the bushing 76 and the flange 24. This eliminates the gap that exists between the threaded end 54 of the bolt 50 and the outer diameter of the aperture 42. The compressed bushing 76 therefore eliminates most or all of the "play" for the toilet seat that may otherwise develop as the threaded connection between the bolt 50 and the nut 60 loosens.

In other exemplary embodiments, the bushing 76 may be a deformable member with an outer diameter that is less than the diameter of the aperture 42. The advancement of the bolt 50 compresses the bushing 76 between the bolt 50 and the nut 60. The compression causes the diameter of the bushing 76 to increase, forcing at least a portion of the outer periphery of the bushing 76 to contact the first component 44 and/or the second component 46 around the aperture 42 and form an interference fit between the bushing 76 and the first component 44 and/or the second component 46. Such a bushing 76 may be a resilient material or may be a relatively rigid material that is folded or otherwise deformed by the compressive force between the bolt 50 and the nut 60. For example, the resilient material may be one which is co-molded or formed with a two-shot process with the insert 64. Examples of resilient materials include polymers such as nylon, polyethylene, high density polypropylene, hard rubbers and silicones, polyetheretherketone, and the like.

The insert 64 may further include other features or elements such as one or more radial openings 79 (e.g., shafts, bores, holes, etc.) for a set screw 78. The radial openings 79 extend from the outer surface of the nut 60 to the threaded opening 70. The radial openings 79 may extend all the way through to the threaded opening 70 or may be separated from the threaded opening 70 by a thin wall. The radial openings 79 may be threaded or non-threaded openings. Once engaged with the bolt 50, the nut 60 may be tightened to advance threaded end 54 in threaded opening 70. After being tightened, the set screw 78 may be coupled to the nut 60. A set screw 78 is received in one of the radial openings 79. After the apparatus 40 is installed (i.e., the nut 60 has engaged the bolt 50 and has been tightened), the set screw 78 is advanced into the radial opening 79 until it contacts the threaded end 54 of the bolt 50. The set screw 78 may contact the threaded end 54 directly or may compress a portion of the insert 64 against the threaded end 54. The contact between the set screw 78 and the threaded end 54 impedes the rotation of the bolt 50 and/or nut 60 and reduces the likelihood that the threaded connection between the bolt 50 and the nut 60 will loosen.

According to an exemplary embodiment, the relief feature is provided in the form of two sets of interlocking teeth. A multitude of engagement features such as a set of teeth 80 (e.g., projections, ribs, protrusions, etc) extend inward from the sleeve 62 into the central opening 68. The teeth 80 engage corresponding engagement features such as set of teeth 85 on the insert 64 to selectively rotationally lock the sleeve 62 and the insert 64. The teeth 80 are formed as wedge or ramp-shaped elements with a generally triangular shaped cross-section. The teeth include a first or slip surface 82 and a second or locking surface 84. The teeth 85 of the insert 64 are similarly shaped with a slip surface 87 and a locking surface 89. The teeth 85 of the insert 64 are oriented opposite of the teeth 80 of the sleeve 62 such that the teeth 80 are received in the spaces between the teeth 85, as shown in FIG. 5.

According to an exemplary embodiment, the threaded connection between the bolt 50 and the nut 60 is a right-handed threaded connection that is tightened by turning the bolt 50 clockwise relative to the nut 60 (or by turning the nut 60 anti-clockwise relative to the bolt 50). As the threaded connection is tightened, the slip surfaces 82 contact the slip surfaces 87. Initially, resistance to the tightening is relatively low and the contact of the slip surfaces 82 and 87 rotates the insert 64 and the sleeve 62 together. As the nut 60 and the bolt 50 contact the first component 44 and the second component 46, the rotation of the bolt 50 relative to the nut 60 is resisted by the compressive force between the components bolt 50, the nut 60, and the components 44 and 46, requiring an increased torque to be applied to the bolt 50 and/or the nut 60 to further tighten the threaded connection.

The teeth 80 and 85 are configured such that a torque above a predetermined limit applied to the threaded connection will cause the slip surfaces 87 of the teeth 85 to slide past the slip surfaces 82 of the teeth 80. Further torque applied to the threaded connection will cause the teeth 85 to continue to slide past the teeth 80 in a ratcheting action. In this way, the likelihood of one of both of the components 44 and 46 being fractured or otherwise damaged by the application of excessive torque to the threaded connection may be reduced. The threshold torque at which the sleeve 62 slips relative to the insert 64 may be adjusted in various ways, including, but not limited to the shape, number, and distribution of the teeth 80 and 85, the clearance between the teeth 80 and the teeth 85, and the stiffness or composition of the material used to form the sleeve 62 and the insert 64.

The teeth 80 and 85 are configured to not interfere with the loosening or unfastening of the threaded connection between the bolt 50 and the nut 60. Turning the bolt 50 anti-clockwise relative to the nut 60 (or by turning the nut 60 clockwise relative to the bolt 50), brings the locking surfaces 84 of the sleeve teeth 80 in contact with the locking surfaces 89 of the insert teeth 85. The locking surfaces 84 and 89 prevent the teeth 80 from moving past the teeth 85 and therefore allow the sleeve 62 to rotate with the insert 64 as the threaded connection is loosened or unfastened.

As shown in FIGS. 3-6, the teeth 80 may be elongated features that extend along the entire length of central opening 68, allowing the sleeve 62 to be formed with an extrusion manufacturing process. Likewise, the teeth 85 may extend from the upper flange 72 to the lower flange 74. The teeth 80 and/or teeth 85 may be distributed regularly or irregularly around the circumference of the sleeve 62 and the insert 64. According to another exemplary embodiment, shown in FIGS. 7-10, the teeth 80 and/or teeth 85 may be discreet elements with a length that does not extend the entire length of the sleeve 62 or the insert 64.

In an exemplary embodiment, the teeth 85 are co-injected with the sleeve 62 and configured to be deformable. In this embodiment, the teeth 85 are configured to be rigid to allow for an additional torque controlling element.

As illustrated in FIGS. 23 and 24, an additional slip member 83 (e.g., liner, sleeve, etc.) is provided between the sleeve 62 and the insert 64. The slip member 83 facilitates more precise controlling of the torque range control of the nut 60. The slip member 83 is configured to be compressible and may be co-injected or slipped on an outer surface of the insert 64. A bottom end of the slip member 83 may be angled as a lead-in portion 131 to facilitate insertion of the slip member 83 and the insert 64 into the sleeve 62. The insert 64 and the slip member 83 may be retained in the nut for an enhanced friction fit for enhanced torque range control. The nut may be configured such that an audio feedback to the user is provided when a predetermined fastening torque is exceeded and the insert 64 rotates relative to the sleeve 62. The audio feedback may be a clicking, squeaking, or snapping sound as the teeth 85 and the slip member 83 engage each other and move past each other.

Figures 25, 26:
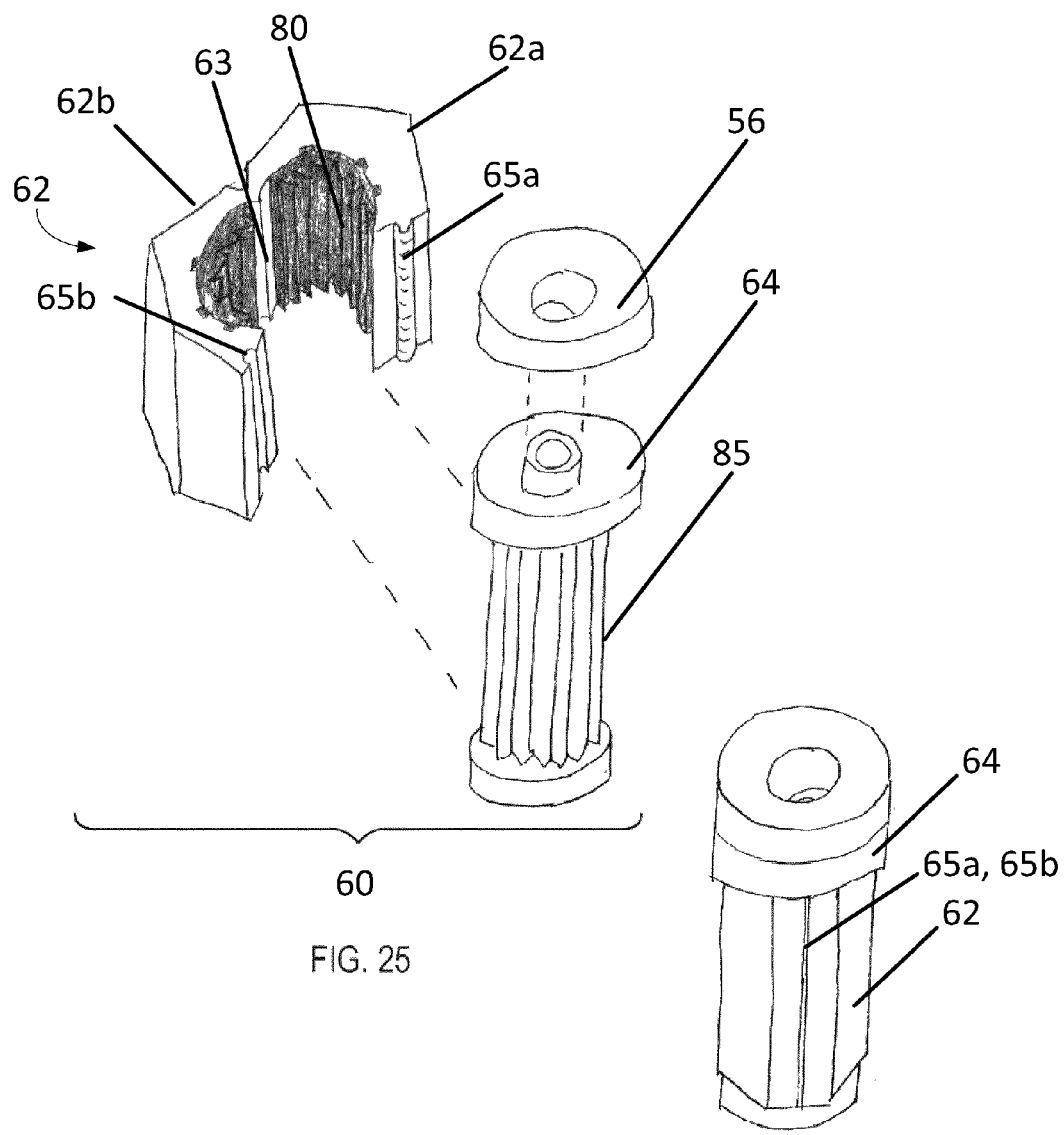
FIG. 25 is an exploded view of a torque control nut for a mounting apparatus, according to an exemplary embodiment.
FIG. 26 is an isometric view of the torque control nut of FIG. 25.
Figure 35:
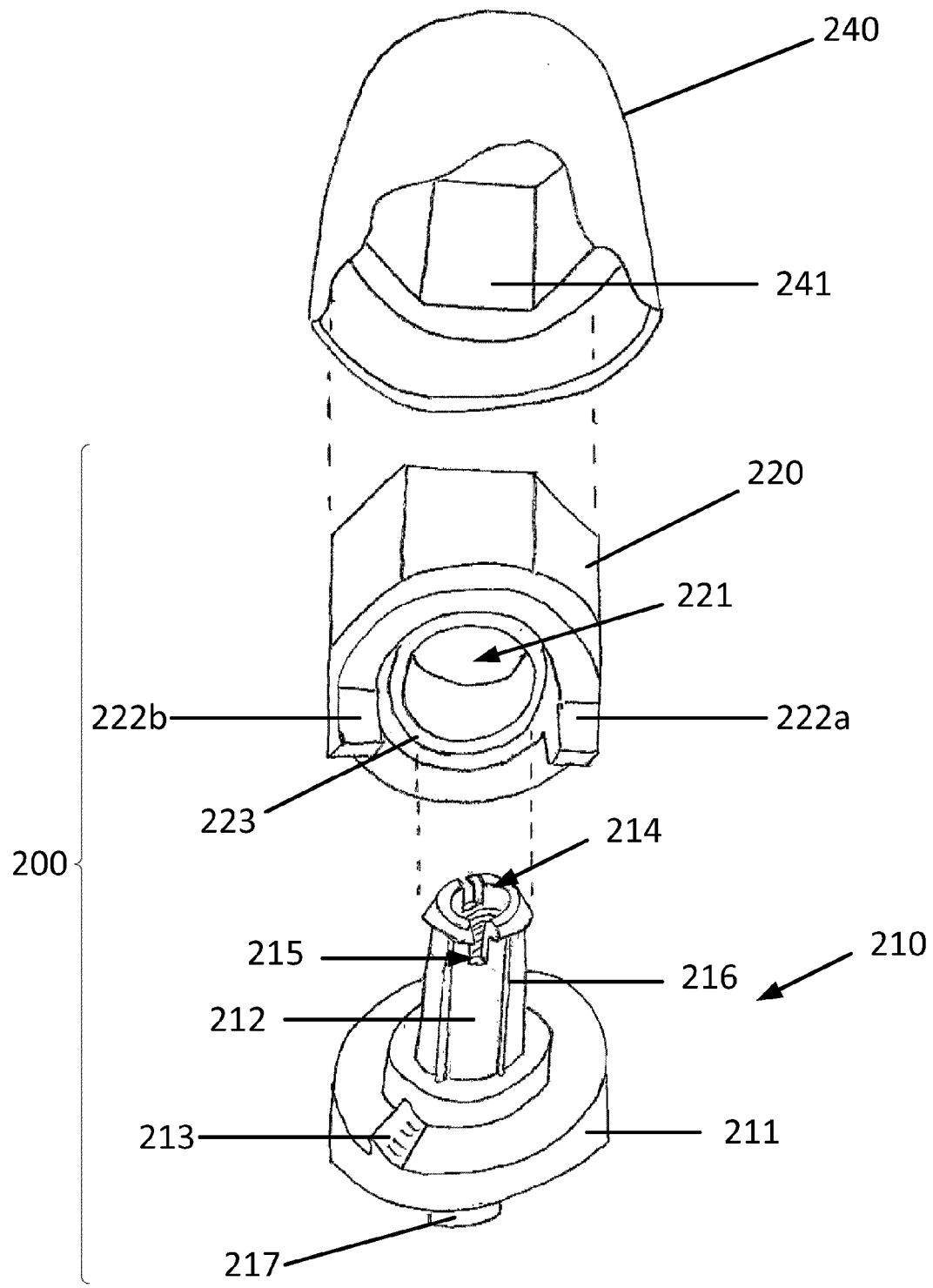
FIG. 35 is an exploded view of one-way fastening nut for a mounting apparatus, according to another exemplary embodiment.

In an embodiment illustrated in FIGS. 25 and 26, the sleeve 62 includes a living hinge 63 configured to allow the sleeve 62 to clamp or close around the insert 64. In an illustrative embodiment, the living hinge 63 is disposed in a central position such that when the sleeve 62 is open, a first arm 62a and a second arm 62b of the sleeve 62 are symmetrical. An end of the first arm 62a that is not coupled to the living hinge 63 includes a protrusion 65a. An end of the second arm 62b that is not coupled to the living hinge 63 includes a recess 65b. The protrusion 65a and the recess 65b are configured to engage via a snap fit.

As shown in FIGS. 7-10, the insert 64 may include one or more relief slots 90. The relief slots 90 allows for an increased amount of deformation of the insert 64. The relief slots 90 may be desirable if, for instance, the material and/or shape of the insert 64 is too stiff to allow the insert 64 to deform such that the teeth 85 can slip past the teeth 80. Relief slot 90 may also be utilized to facilitate the insertion of the insert 64 into the sleeve 62 or a snap fit between insert 64 and sleeve 62.

Figure 11:
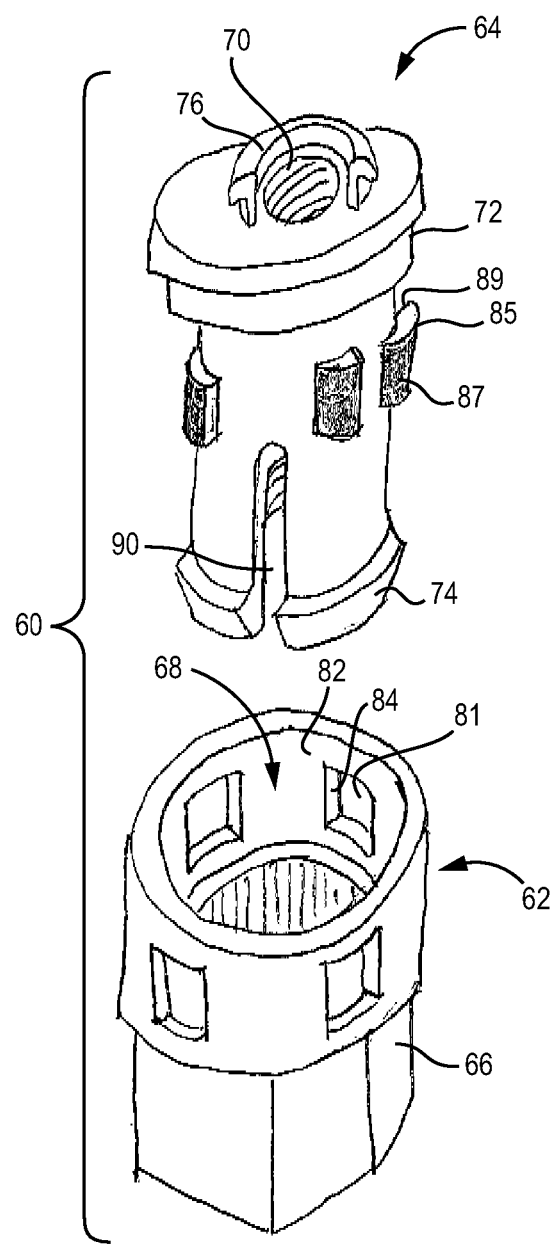
FIG. 11 is an exploded view of a two part torque control nut for a mounting apparatus, according to another exemplary embodiment.

As shown in FIG. 11, in other embodiments, sleeve 62 may lack teeth. Instead, a multitude of openings 81 may be formed in the side wall of sleeve 62 that are configured to receive the teeth 85 of the insert 64. In this embodiment, the slip surface 82 is the inner surface defining the central opening 68 and the locking surface 84 is a side face of the opening 81. When tightening the mounting apparatus 40, the insert 64 is rotated until the teeth 85 are received in the openings 81. If an excessive torque is applied, the angled slip surfaces 87 of the teeth 85 allow the teeth 85 to escape the openings and slide along the slip surface 82 of the sleeve 62. When loosening the mounting apparatus 40, the teeth 85 are similarly received in the openings 81. However, the locking surfaces 84 and 89 retain the teeth 85 in the openings 81 and lock the sleeve 62 to the insert 64.

Figure 12:
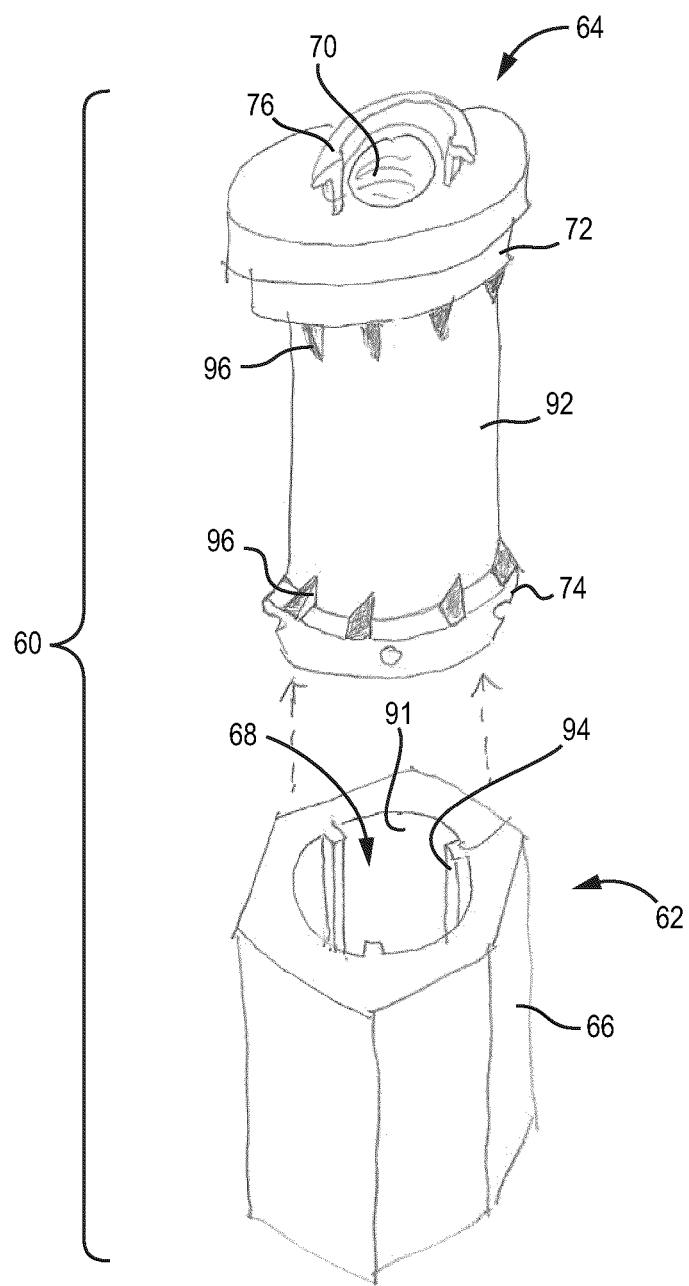
FIG. 12 is an exploded view of a torque control nut for a mounting apparatus, according to another exemplary embodiment.

Referring now to FIG. 12, according to another exemplary embodiment, the sleeve 62 and the insert 64 may lack teeth. Instead, the insert 64 may include a surface 92 extending between the upper flange 72 and the lower flange 74. With the insert 64 fitted inside the sleeve 62, the surface 92 contacts longitudinal ridges or ribs 94 that extend inward from a surface 91 defining the central opening 68 of the sleeve 62. The ribs 94 form an interference fit with the contact surface 92 that resists the rotation of the sleeve 62 relative to the insert 64. If a torque above a predetermined limit is applied to the nut 60, such as when being coupled to the bolt 50, the interference fit between the contact surface 92 and the ribs 94 is overcome, allowing the sleeve 62 to turn independent of the insert 64. To allow for the unencumbered loosening or removal of the nut 60, tabs 96 may be provided extending downward from the upper flange 72 and/or upward from the lower flange 74. The tabs 96 are oriented radially relative to the contact surface 92 and provide stops to limit the rotation of the sleeve 62 relative to the insert 64.

Alternatively, the surface 91 may form an interference fit with the contact surface 92 to resist the rotation of the sleeve 62 relative to the insert 64. As described above, a torque above a predetermined limit overcomes the interference fit between the surfaces 91 and 92 and allows the sleeve 62 to turn independent of the insert 64. According to an exemplary embodiment, the ribs 94 may not extend along the entire length of the sleeve 62. Instead, the ribs 94 may be protrusions or tabs proximate to the ends of the sleeve 62 that interface with the tabs 96 to facilitate the locking of the sleeve 62 and insert 64 when unfastening the bolt 50 and nut 60.

Figure 13:
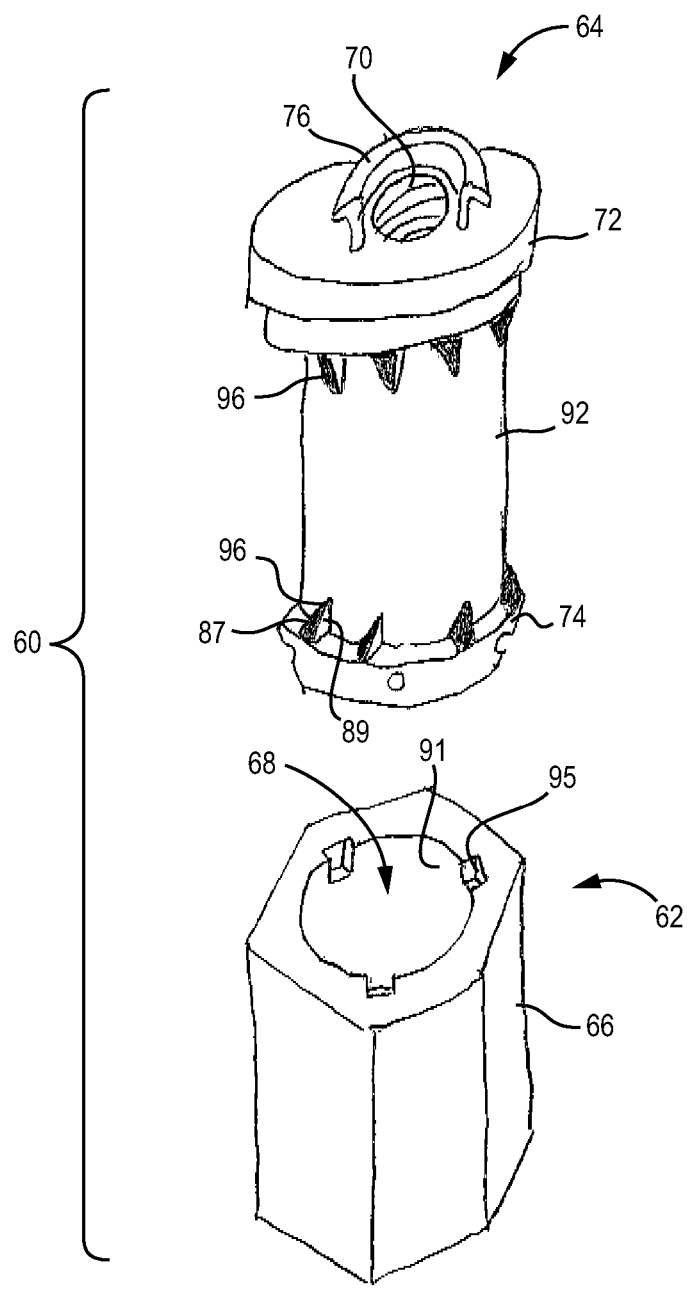
FIG. 13 is an exploded view of a torque control nut for a mounting apparatus, according to another exemplary embodiment.

As shown in FIG. 13, in other embodiments, the sleeve 62 lacks ribs 94 that extend inward from a surface 91 defining the central opening 68 of the sleeve 62. Instead, an interference fit is formed between with the surface 91 and the tabs 96. The tabs 96 are oriented radially relative to the contact surface 92 and provide stops to limit the rotation of the sleeve 62 relative to the insert 64. The tabs 96 are formed with a wedge-shaped cross-section with a vertical locking surface 89 and an angled slip surface 87. The tabs 96 are received in recesses 95 formed about the periphery of the opening 68. Loosening the mounting apparatus 40 by turning the bolt 50 anti-clockwise relative to the nut 60 (or by turning the nut 60 clockwise relative to the bolt 50), brings the locking surfaces 84 of at least some of the tabs 96 in contact with the sides of the recesses 95. The locking surfaces 89 retain the tabs 96 in the recesses 95 and therefore allow the sleeve 62 to rotate with the insert 64 as the threaded connection is loosened or unfastened. When tightening the mounting apparatus 40, the slip surfaces 87 of the tabs 96 allow the tabs 96 to slide out of the recesses 95.

Referring now to FIGS. 14-17 and 27-34, a bolt 50 for a mounting apparatus is shown according an exemplary embodiment. The bolt 50 includes a release feature to reduce the likelihood of the first component 44 or the second component 46 being fractured or otherwise damaged by an excessive torque applied to tighten the bolt 50 and the nut 60. The upper portion 52 of the bolt 50 includes a main body 100 that is coupled to the threaded end 54 and an insert 102 that is engaged by a tool such as a screw driver to rotate the bolt 50. At least a portion of the insert 102 is received in an opening or socket 104 formed in the main body 100. The insert 102 is configured to rotate relative to the main body 100 if a sufficient torque is applied to the bolt 50. As described above in regards to the nut 60 the main body 100 and the insert 102 may be coupled together by teeth that provide a torque control feature. A multitude of teeth 106 extend from the main body 100 and engage corresponding teeth 108 on the insert 102 to selectively rotationally lock the main body 100 and the insert 102 in the unfastening direction.

Figures 14, 15, 16, 17:
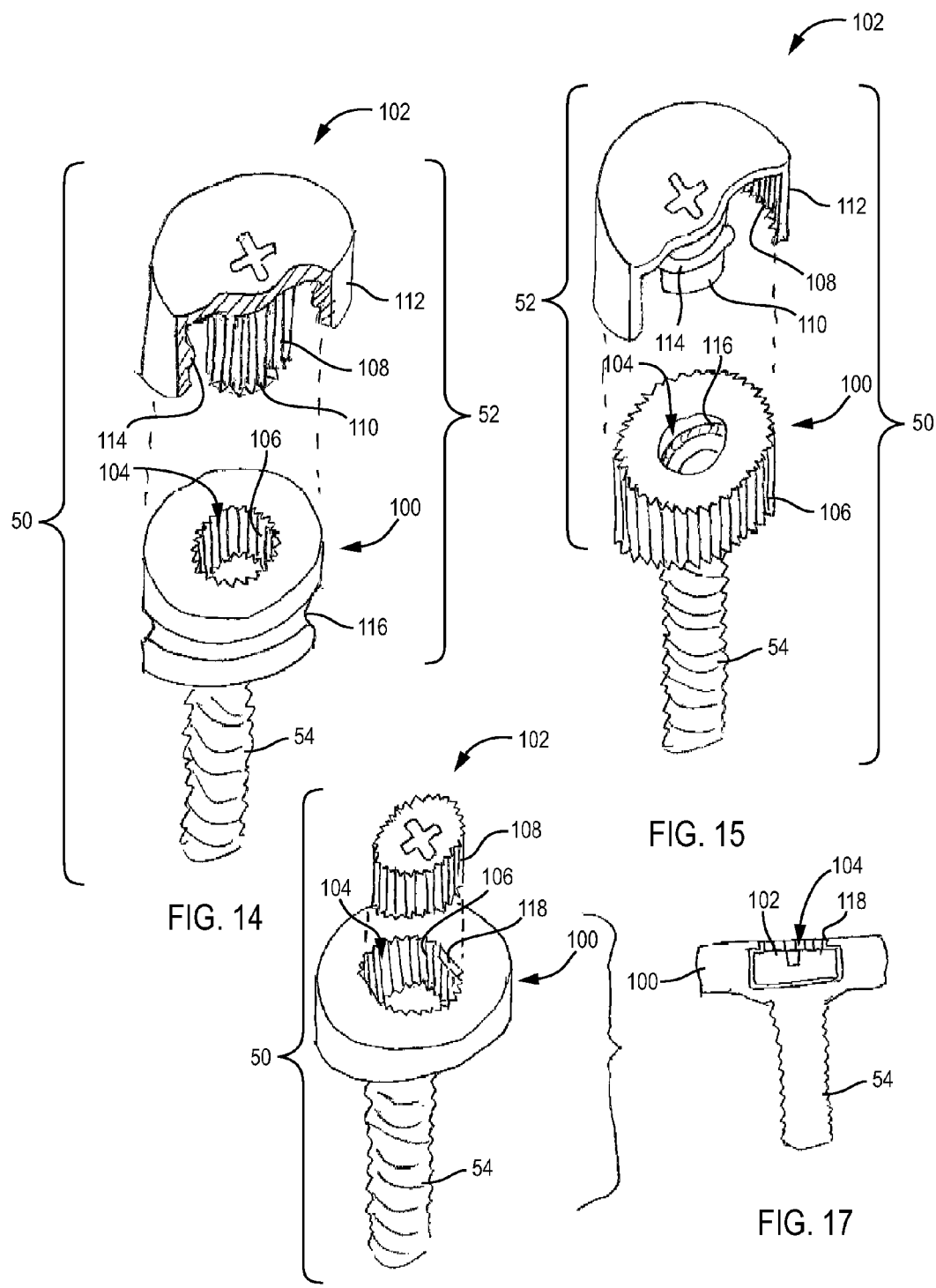
FIG. 14 is an exploded view of a torque control bolt for a mounting apparatus, according to an exemplary embodiment.
FIG. 15 is an exploded view of a torque control bolt for a mounting apparatus, according to another exemplary embodiment.
FIG. 16 is an exploded view of a torque control bolt for a mounting apparatus, according to an exemplary embodiment.
FIG. 17 is a cross-section view of the bolt of FIG. 16.

According to one exemplary embodiment, shown in FIG. 14, the insert 102 is a cup-shaped body with a central projection 110 and a cylindrical skirt or sidewall 112. The teeth 108 extend outward from the projection 110. The main body 100 is received in the annular space formed between the projection 110 and the sidewall 112. The teeth 106 extend inward into the opening 104 and interface with the teeth 108 similar to the teeth 80 and 85 of the nut 60. The insert 102 is rotatably coupled to the main body 100 via a snap fit formed by a ridge 114 on sidewall 112 of the insert 102 and a groove 116 around the outer periphery of the main body 100. The ridge 114 may be a continuous body extending around the entire sidewall 112 or may comprise multiple, discrete ridges. According to other exemplary embodiments, the relative positions of the ridge 114 and the groove 116 may be reversed, with a ridge extending outward from the main body 100 and engaging a groove formed in the sidewall 112.

According to another exemplary embodiment, shown in FIG. 15, the teeth 106 may extend outward from the periphery of the main body 100 and interface with teeth 108 extending inward from the sidewall 112. The insert 102 is rotatably coupled to the main body 100 via a snap-fit formed by a ridge 114 on the projection 110 and a groove 116 around the outer periphery of the opening 104 in the main body 100.

According to another exemplary embodiment, shown in FIGS. 16-17, the insert 102 may lack a sidewall and instead be a disc-shaped body received entirely within the opening 104. Similar to the embodiment shown in FIG. 12, the teeth 108 extend outward from the insert 102 and engage teeth 106 extending inward into the opening 104. The insert 102 is retained within the opening 104 by an overhanging lip 118 around the opening 104. As illustrated in FIG. 31, additional components such as a washer 56 may be provided to facilitate coupling of the bolt 50 and the nut 60.

Figures 18, 19:
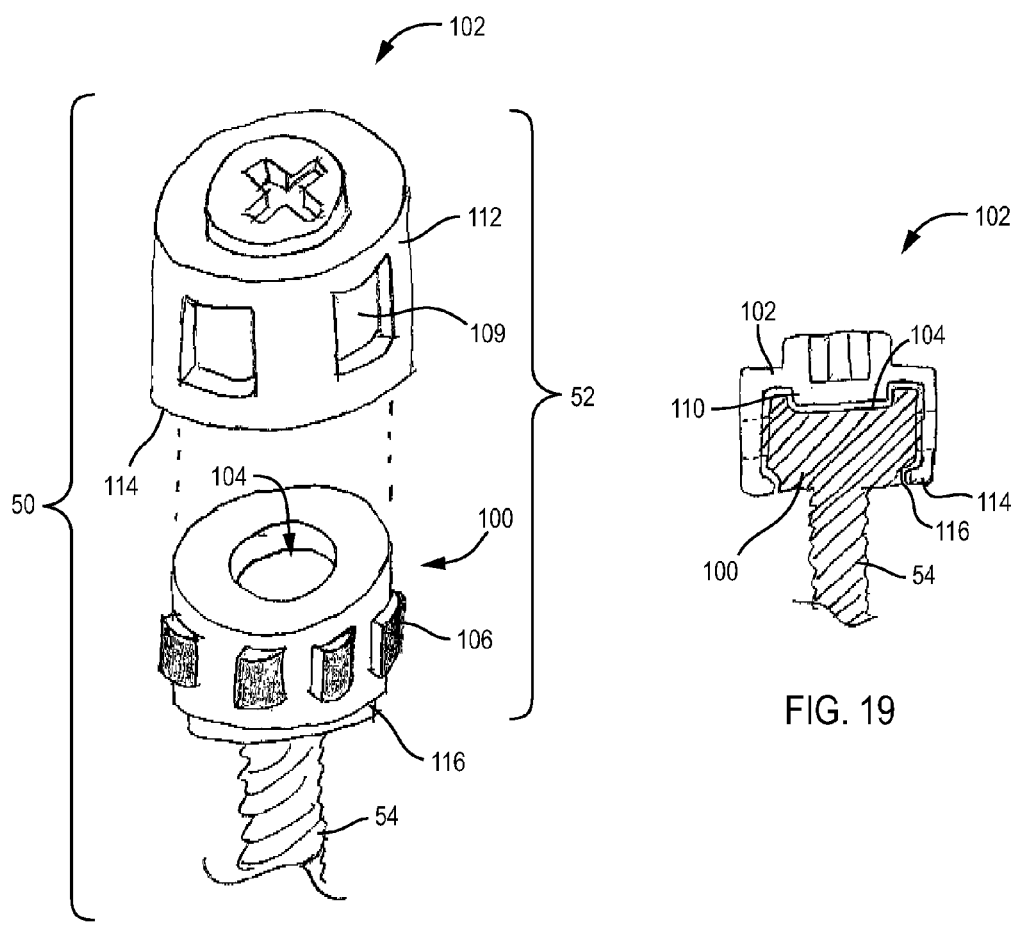
FIG. 18 is an exploded view of a torque control bolt for a mounting apparatus, according to an exemplary embodiment.
FIG. 19 is a cross-section view of the bolt of FIG. 18.
Figure 20:
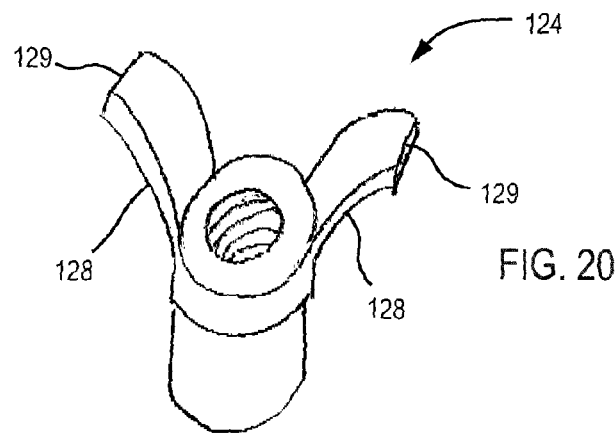
FIG. 20 is an isometric view of a nut for a toilet seat mounting apparatus, according to an exemplary embodiment.
Figure 21:
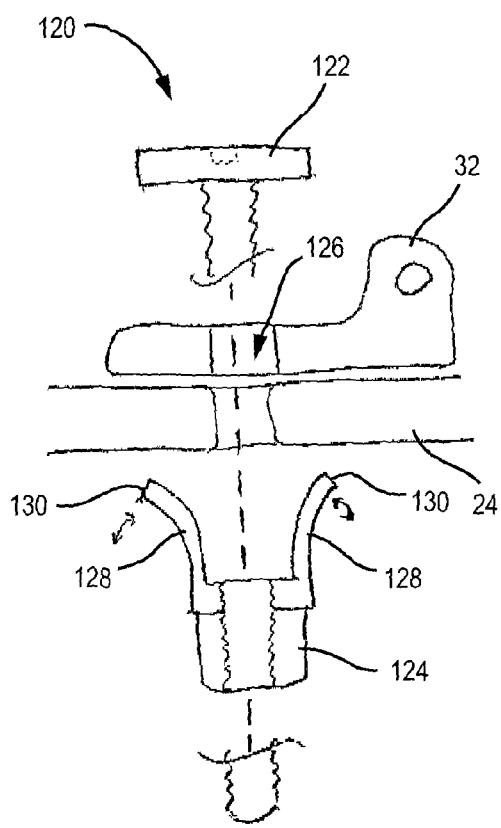
FIG. 21 is a cross section of a toilet seat mounting apparatus including the nut of FIG. 20 unseated.
Figure 22:
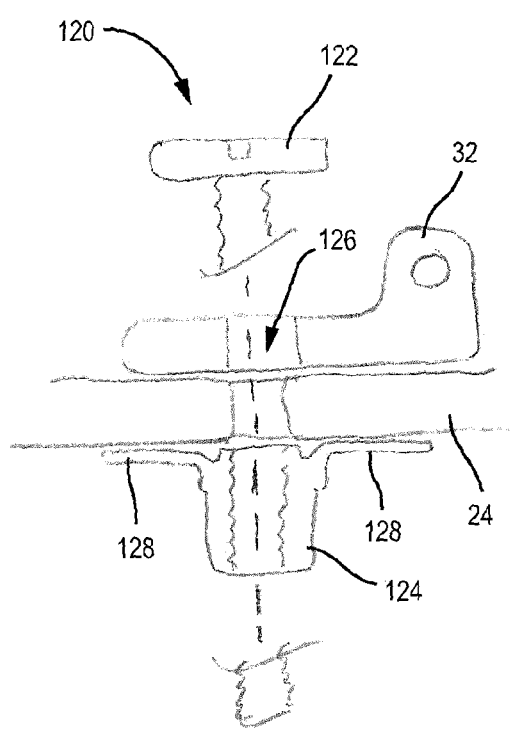
FIG. 22 is a cross section of the toilet seat mounting apparatus of FIG. 21 with the nut fully seated.

According to another exemplary embodiment, shown in FIG. 18-19, the teeth 106 may not extend along the entire height of the main body 100. The teeth 106 interface with openings 109 formed in the sidewall 112. The projection 110 is received in a recess or hollow 104 in the main body 100. The insert 102 is rotatably coupled to the main body 100 via a snap-fit formed by a ridge 114 extending inward from the sidewall 112 and a groove 116 around the outer periphery of the main body 100.

According to another exemplary embodiment, shown in FIGS. 27-30, the main body 100 and the insert 102 may be coupled together by friction fit and folding tabs 105 that provide a torque control feature. The folding tabs 105 extend from the insert 102 and engage corresponding recesses 107 on the main body 100 to selectively rotationally lock the main body 100 and the insert 102 in the unfastening direction. The folding tabs 105 may be, for example, arc-shaped protrusions. The folding tabs 105 may be configured such that when a predetermined torque is applied, the user hears an audible click when the folding tabs 105 are received in the recesses 107. The main body 100 and the insert 102 may also have teeth 106 and teeth 108, respectively, to selectively rotationally lock the main body 100 and the insert 102 in the unfastening direction. One or more additional components such as a washer 56 may be provided to facilitate coupling of the bolt 50 and the nut 60.

As illustrated in FIGS. 33 and 34, if the teeth 106 are not co-injected with the main body 100, the teeth 106 may be provided on an additional slip member 111 (e.g., liner, sleeve, etc.) configured to be provided between the main body 100 and the insert 102. The slip member 111 facilitates more precisely controlling the torque range control of the bolt 50. The slip member 111 is configured to be compressible and may be co-injected or slipped on an outer surface of the insert 102. The insert 102 and the slip member 111 may be retained in the bolt head with a friction fit for enhanced torque range control. The bolt may be configured such that an audio feedback to the user is provided when a predetermined fastening torque is exceeded and the insert 102 rotates relative to the main body 100. The audio feedback may be a clicking, squeaking, or snapping sound as the teeth 106 and the teeth 108 engage each other and move past each other.

Referring now to FIGS. 20-22 and 32, a mounting apparatus 120 is shown according to another exemplary embodiment. The mounting apparatus 120 includes a bolt 122, and a nut 124. The mounting apparatus 120 may be utilized, for example, to couple a toilet seat hinge 32 to the toilet bowl flange 24. The bolt 122 is received within the aperture 126 formed in the hinge 32 and the toilet bowl flange 24. Through the interconnection of the bolt 122, the hinge 32, and the nut 124, the toilet seat may be coupled to the toilet bowl flange 24.

The nut 124 includes one or more wings 128 (e.g., extensions, flaps, arms, etc.). The wings 128 extend upward from the nut 124 and may have a distal end 129 that is curled slightly outward. The wings 128 are formed of a resilient material that may be flexed without permanently deformation. According to an exemplary embodiment, the nut 124 is formed of a nylon material. As the nut 124 is advanced onto the bolt 122, the distal ends 129 of the wings 128 contact the underside of the flange 24 and are forced outward. Further tightening of the nut 124 causes the wings 128 to be pushed further outward until they lay substantially along the underside of the flange 24. The resilient nature of the wings 128 maintains a force on the underside of the flange 24 that resists rotation of the nut 124 relative to the flange 24.

It can be difficult to access the top and bottom of the toilet flange 24 simultaneously for some toilets. The friction between the wings 128 and the flange 24 facilitates the installation of the hinge 32. During the installation process, the nut 124 may be started by hand for the initial turns until the wings 128 contact the flange 24. The nut 124 may then be released and the threaded connection can be further tightened by turning the bolt 122. In this way, the awkward position of accessing the underside of the toilet bowl flange 24 when tightening the mounting apparatus 120 can be avoided. Further, the force applied to the flange 24 by the wings 128 reduces the tendency of the mounting apparatus 120 to loosen over time.

Referring now to FIGS. 35-38, a multi-part nut 200 is shown according an exemplary embodiment. The nut 200 may be used, for example, in the mounting apparatuses 40 and 120 described above. The nut 200 includes an inner member 210 and an outer member 220. The inner member 210 is configured to rotationally lock with the outer member 220 via an application of a threshold torque.

The inner member 210 includes a base portion 211 and a projecting portion 212 that extends along the longitudinal axis of the inner member 210. The base portion 211 includes at least one engagement feature 213. In one embodiment, at least one engagement feature 213 is a wedge-shaped catch having a triangular cross section. One of ordinary skill in the art will appreciate that at least one engagement feature 213 may be of a variety of shapes, provided that at least one engagement feature 213 is capable of interacting with an engagement feature of the outer member 220 to limit rotation of the outer member 220 relative to the inner member 210 (the interaction of the inner and outer members will be described in further detail below). The projection portion 212 includes a threaded opening 214 configured to receive a bolt (not illustrated) and a plurality of relief slots 215 configured to engage with a flange 223 of the outer member 220 (described in further detail below). The bolt may be, for example, any of the bolts described above.

The outer member 220 includes a central opening 221 that extends along the longitudinal axis of the outer member 220 and is configured to receive the projecting portion 212 of the inner member 210. The outer member 220 may be, for example, a sleeve. The outer member 220 further includes at least one engagement feature 222. For example, at least one engagement feature 222 may be a flex tab. In one embodiment, at least one engagement feature 222 may involve two flex tabs 222a and 22b. An inner surface of the outer member 220 includes a flange 223. The flange 223 is configured to be received over the relief slots 215 in order to allow the inner member 210 and the outer member 220 to be axially coupled via the snap fit.

The outer member 220 may have a hexagonal outer surface for use with a wrench or a tool. In other exemplary embodiments, the outer surface may be a knurled or otherwise textured surface. In still other embodiments, the sleeve may include other features such as wings or ribs to facilitate hand-tightening of the nut 200.

The inner member 210 is configured to axially couple to the outer member 220 via a snap fit. When the inner member 210 and the outer member 220 are snapped together, a surface of at least one engagement feature 222 contacts an upper surface of the base portion 211. In one embodiment, an outer surface of the projecting portion 212 is provided with a plurality of crush ribs 216. The crush ribs 216 are configured to provide a predetermined friction fit between the inner member 210 and the outer member 220, to help assist in achieving a predetermined threshold torque, which will cause the outer member 220 to slip or rotate on the inner member 210. That is, crush ribs 216 are configured to assist a user in achieving the threshold torque that allows the inner member 210 to rotationally slip or lock with the outer member 220.

In one embodiment, at least one engagement feature 222 comprises at least two flex tabs 222a, 222b evenly spaced about a perimeter of the outer member 220. In this embodiment, when the threshold torque is applied, a first flex tab 222a flexes over at least one engagement feature 213 when the outer member 220 is rotated in a first direction (e.g., clockwise direction) relative to the inner member 210. However, the outer member 220 is prevented from rotation in a second direction (e.g., counterclockwise direction) relative to the inner member 210 by interaction of a flex tab 222 with a non-inclined portion of at least one engagement feature 213 (i.e., a vertical portion of the triangular cross-section that is not the hypotenuse of the triangle). Therefore, at least one engagement 213 allows for one-way rotation of the outer member 220 relative to the inner member 210.

As illustrated, an outer surface or configuration of the base portion 211 is round. In other embodiments, the base portion 211 may have a different shape to provide a secondary element for coupling and uncoupling the inner member 210 to and from a bolt. For example, the base portion 211 may have a hexagonal outer configuration for use with a wrench, to provide a secondary or back-up fastening and unfastening element. The secondary or back-up fastening and unfastening element is not a torque controlled fastening and unfastening element.

The base portion 211 may include an integral bushing 217. The bushing 217 is sized such that it may be placed, for example, in the aperture 42 of the mounting apparatus 40. In one embodiment, the outer diameter of the bushing 217 is slightly larger than the diameter of the aperture 42. An interference fit is therefore formed between the bushing 217 and the flange 24. This eliminates the gap that exists between the threaded end of a bolt received by the nut 200 and the outer diameter of the aperture 42. The bolt received by the nut 200 may be, for example, the bolt 50. The compressed bushing 217 therefore eliminates most or all of the "play" for the toilet seat that may otherwise develop as the threaded connection between the bolt and the nut 200 loosens.

In other exemplary embodiments, the bushing 217 may be a deformable member with an outer diameter that is less than the diameter of the aperture 42. The advancement of the bolt compresses the bushing 217 between the bolt and the nut 200. The compression causes the diameter of the bushing 217 to increase, forcing at least a portion of the outer periphery of the bushing 217 to contact the first component 44 and/or the second component 46 around the aperture 42 and form an interference fit between the bushing 217 and the first component 44 and/or the second component 46. Such a bushing 217 may be a resilient material or may be a relatively rigid material that is folded or otherwise deformed by the compressive force between the bolt and the nut 200. For example, the resilient material may be one which is co-molded or formed with a two-shot process with the inner member 210. Examples of resilient materials include polymers such as nylon, polyethylene, high density polypropylene, hard rubbers and silicones, polyetheretherketone, and the like.

Although not illustrated, in one embodiment, the nut 200 may include an additional slip member (e.g., liner, sleeve, etc.) provided between inner member 210 and the outer member 220. Similar to the slip member 83 illustrated in FIGS. 23 and 24, the slip member facilitates more precise controlling of the torque range control of the nut 200. The slip member may include teeth. The slip member 200 is configured to be compressible and may be co-injected or slipped on an outer surface of the inner member 210. A bottom end of the slip member may be angled as a lead-in portion to facilitate insertion of the slip member and the inner member 210 into the outer member 220. The inner member 210 and the slip member may be retained in the nut 200 for an enhanced friction fit for enhanced torque range control. The nut 200 may be configured such that an audio feedback to the user is provided when a predetermined fastening torque is exceeded and the inner member 210 rotates relative to the outer member 220. The audio feedback may be a clicking, squeaking, or snapping sound as the teeth and the slip member engage each other and move past each other.

In one embodiment, the nut 200 may further include a decorative cap 240 configured to cover the outer member 220 the inner member 210 when they are assembled or coupled. The decorative cap 240 is generally hollow and dome-shaped. In an illustrative embodiment, an interior surface 241 of the decorative cap 240 is molded such that the interior surface 241 includes contours corresponding to a shape of the outer surface of the outer member 220.

While the mounting apparatuses 40 and 120 have been described as being utilized for coupling together components of a toilet or coupling a toilet to the floor, in other exemplary embodiments, the mounting apparatuses 40 and 120 may be utilized in other applications where a torque controlled fastener would be beneficial.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example is manifestly intended to be as broad as possible. For example, unless specifically otherwise noted a single particular element may also encompass a plurality of such particular elements. The invention should therefore not be limited by the above described embodiment, method, and examples, but by all embodiments and methods within the scope and spirit of the invention.

It is also important to note that the construction and arrangement of the elements of the system as shown in the illustrative embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Further, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the illustrative embodiments without departing from the spirit of the present subject matter, as presented in the following claims.

What is claimed is:

1. A mounting apparatus comprising:
   a bolt; and
   a nut comprising:
      a body having
         an upper surface;
         a lower surface;
         an inner surface comprising a threaded opening extending in a longitudinal direction of the body, the threaded opening configured to receive the bolt; and
         an outer surface; and
      a plurality of wings extending outwardly from the outer surface at a location closer to the upper surface than the lower surface, the plurality of wings consisting of two wings spaced 180 degrees apart from each other;
   wherein the wings are formed of a resilient material and configured to reversibly flex between a first position and a second position, and
   wherein in the second position, the wings are substantially orthogonal to the longitudinal axis of the body.

2. The mounting apparatus according to claim 1, wherein each wing is curled outwards with respect to the longitudinal axis of the body.

3. The mounting apparatus according to claim 1, wherein in the first position, the wings extend upwards with respect to the upper surface of the body and outwards with respect to the longitudinal axis of the body.

4. The mounting apparatus according to claim 1, wherein in the second position, a surface of each wing is planar with the upper surface of the body.

5. The mounting apparatus according to claim 1, wherein the bolt comprises threads configured to mate with the threaded opening of the nut to secure a plurality of objects between a portion of the bolt and the upper surface of the nut.

6. The mounting apparatus according to claim 1, wherein when the bolt is received in the threaded opening of the nut to secure a plurality of objects between a portion of the bolt and the upper surface of the nut, the wings flex towards the second position, and in the second position, the wings lay substantially flat against a surface of one of the plurality of objects to be secured between the portion of the bolt and the upper surface of the nut.

7. The mounting apparatus according to claim 6, wherein a force applied by the wings to the one of the plurality of objects reduces a tendency of the mounting apparatus to loosen by resisting a rotation of the nut relative to the one of the plurality of objects, and the force is applied due to a resilience of the wings.

8. The mounting apparatus according to claim 1, wherein the nut is formed of a nylon material.

9. The mounting apparatus according to claim 1, wherein the bolt and the nut are configured to secure a hinge to a flange of a toilet.

10. The mounting apparatus according to claim 1, wherein the bolt comprises:
    a main body having an opening formed therein; and
    an insert configured to be received in the opening of the main body, the insert configured to be engaged by a tool to rotate the bolt.

11. The mounting apparatus according to claim 10, wherein a plurality of teeth are provided along a perimeter of the insert and configured to provide torque control.

12. The mounting apparatus according to claim 1, further comprising a washer disposed between the bolt and the nut.

13. The mounting apparatus according to claim 1, wherein in the first position, at least a portion of each wing is parallel to the longitudinal axis of the body.

14. A mounting apparatus comprising:
- a bolt; and
- a nut comprising:
  - a body having
    - an upper surface;
    - a lower surface;
    - an inner surface comprising a threaded opening extending from in a longitudinal direction of the body, the threaded opening configured to receive the bolt; and
    - an outer surface; and
  - a plurality of wings extending from the outer surface at a location closer to the upper surface than the lower surface,
- wherein the wings are formed of a resilient material and configured to reversibly flex between a first position and a second position,
- wherein in the first position, at least a portion of each wing is parallel to the longitudinal axis of the body, and in the second position, at least a portion of each wing is orthogonal to the longitudinal axis of the body.

15. A method of using the mounting apparatus of claim 1, the method comprising:
- aligning an aperture of a first object to be secured by the mounting apparatus with an aperture of a second object to be secured by the mounting apparatus;
- inserting the bolt through the aperture of the first object and the aperture of the second object;
- receiving the bolt in the threaded aperture of the nut, where the nut is in the first position;
- rotating the nut until the wings contact a surface of the second object; and
- rotating the bolt to further tighten the connection between the bolt and the nut, until the wings of the nut flex to the second position in which the wings lay substantially flat against a surface of the second object.

16. The method of claim 15, wherein rotating the nut and rotating the bolt causes the wings to apply a force to the second object due to a resilience of the wings, the force reducing a tendency of the mounting apparatus to loosen by resisting a rotation of the nut relative to the second object.

17. The method of claim 15, wherein the nut is manually rotated without a tool.

18. The method of claim 17, wherein after manually rotating the nut, the nut is released prior to rotating the bolt.

19. The method of claim 15, wherein the first object is a hinge and the second object is a flange of a toilet.

* * * * *